Oct. 5, 1948.  F. F. MURRAY  2,450,842
EDGE TRIMMING MACHINE
Filed Jan. 24, 1948  4 Sheets-Sheet 2
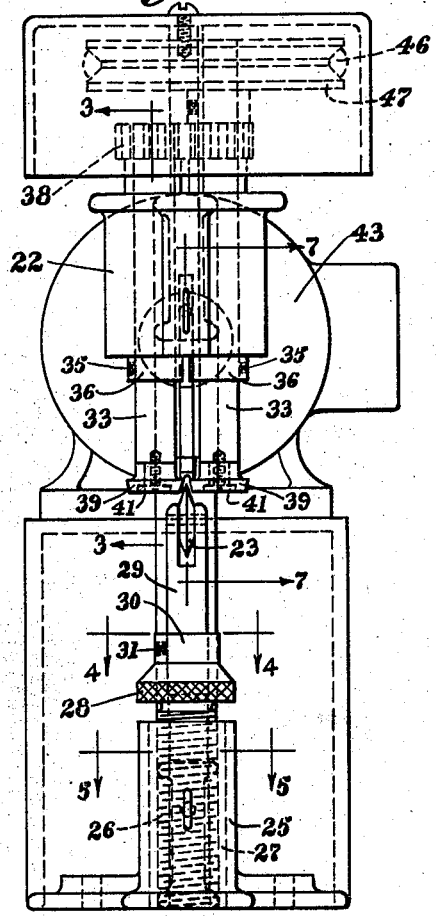
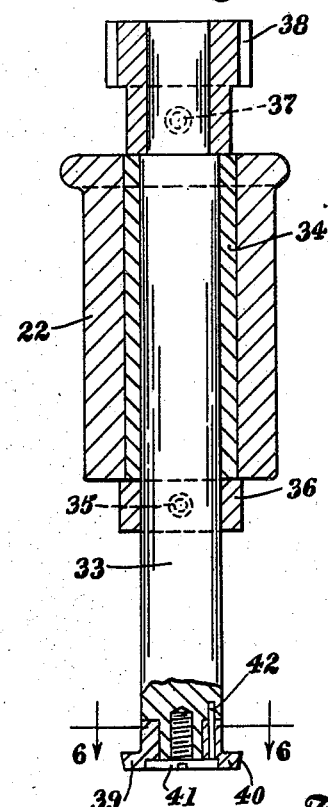
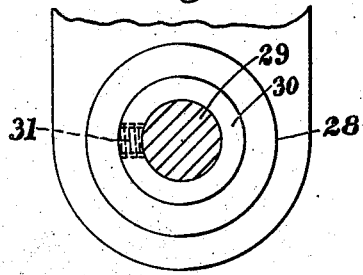
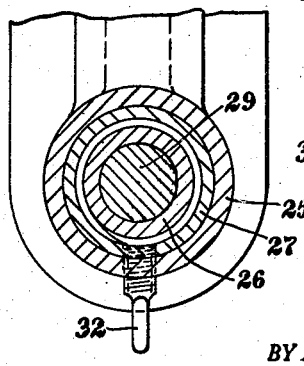
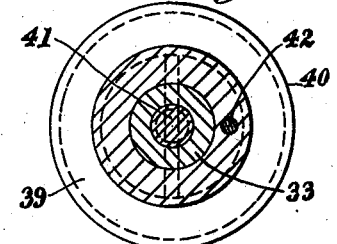
INVENTOR.
Forrest F. Murray.
BY Heard Smith & Tennant
Attorneys

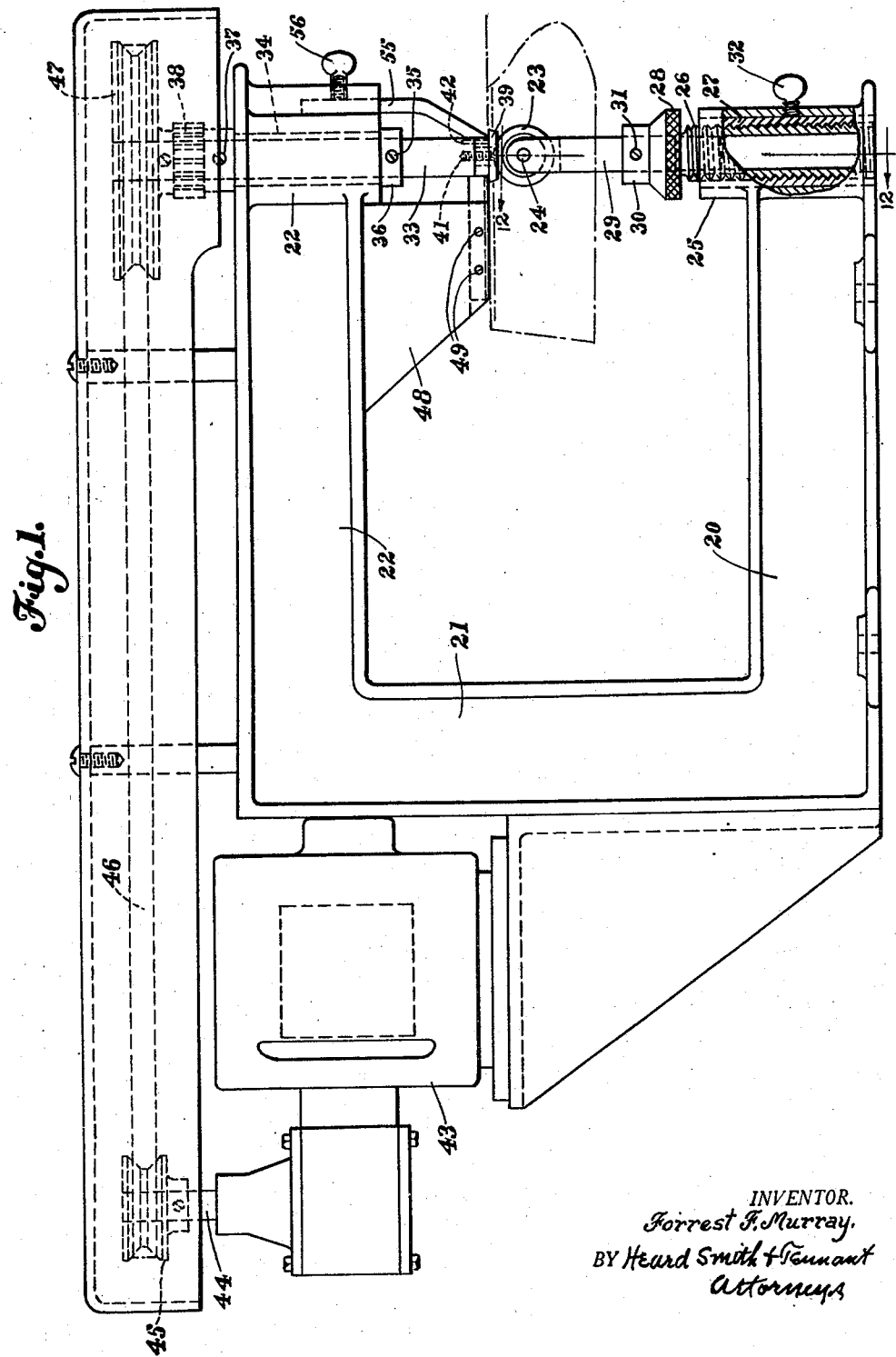

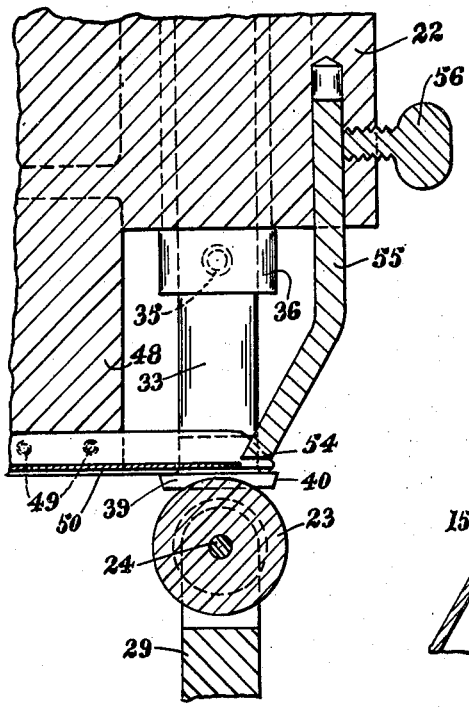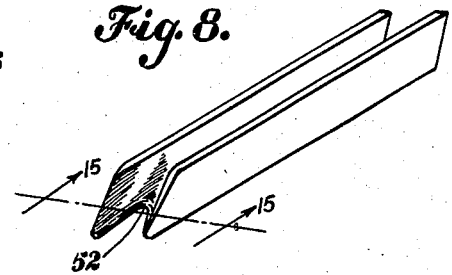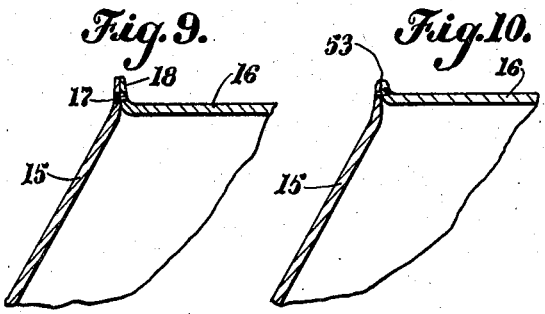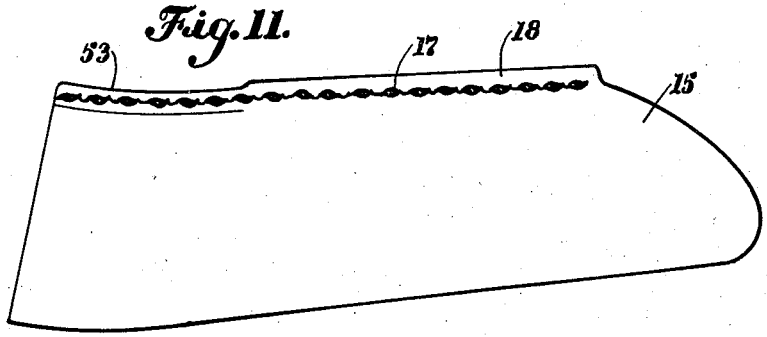
INVENTOR.
Forrest F. Murray.
BY Heard Smith & Tennant
attorneys Oct. 5, 1948.    F. F. MURRAY    2,450,842
EDGE TRIMMING MACHINE
Filed Jan. 24, 1948    4 Sheets-Sheet 4
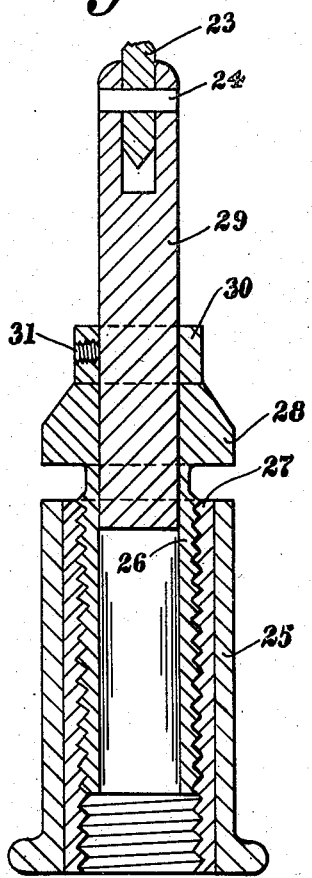
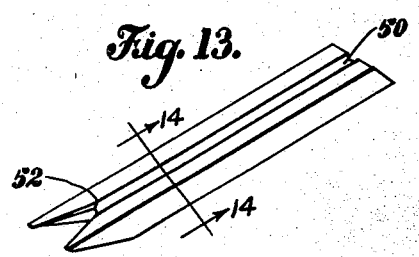
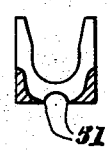
INVENTOR.
Forrest F. Murray,
BY Heard Smith & Tennant
Attorneys Patented Oct. 5, 1948

2,450,842

UNITED STATES PATENT OFFICE 2,450,842

EDGE TRIMMING MACHINE

Forrest F. Murray, Brockton, Mass., assignor to Forrest F. Murray and Harry R. Murray, a copartnership doing business as Murray Manufacturing Co., Avon, Mass.

Application January 24, 1948, Serial No. 4,191

8 Claims. (Cl. 12—1)

This invention has for its object to provide a machine for trimming the projecting margins of two side-by-side stitched-together sheets of flexible material of a piece of work. An example of such a piece of work is the fore part of a leather moccasin in which a sheet of leather from which the sides of the fore part and a sheet forming the top of the fore part are stitched together side-by-side leaving projecting upstanding margins which have to be trimmed off close to the line of stitching and so as to leave a neatly finished edge.

The object of the invention is further to provide in such a machine for the trimming of the projecting margins so as to leave the trimmed edge with a smooth convex surface.

The object of the invention further is to provide such a machine in which the work may be positioned, fed and trimmed accurately, rapidly and efficiently.

These and other objects of the invention will appear more fully from the accompanying description and drawings and will be particularly pointed out in the claims.

The drawings illustrate a preferred form of machine embodying the invention particularly designed for trimming the projecting margins in the case of a moccasin.

In the drawings:

Fig. 1 is a side elevation of such a machine with a portion broken away;

Fig. 2 is a front elevation of the machine shown in Fig. 1;

Fig. 3 is a detail, partially in cross section, taken on the line 3—3 of Fig. 2;

Fig. 4 is a detail in cross section taken on the line 4—4 of Fig. 2;

Fig. 5 is a detail in cross section taken on the line 5—5 of Fig. 2;

Fig. 6 is a detail in cross section taken on the line 6—6 of Fig. 3;

Fig. 7 is a detail in cross section taken on the line 7—7 of Fig. 2;

Fig. 8 is a view in perspective of the knife element of the machine;

Fig. 9 is a detail in cross section through the fore part of a moccasin with the projecting margins untrimmed;

Fig. 10 is a view similar to Fig. 9 after the projecting margins have been trimmed by the machine;

Fig. 11 is a side view of the fore part of the moccasin showing the projecting margins partially trimmed;

Fig. 12 is a view in cross section taken on the line 12—12 of Fig. 1;

Fig. 13 is a bottom view in perspective of the knife element shown in Fig. 8;

Fig. 14 is a view in cross section of the knife element taken on the line 14—14 of Fig. 13; and, Fig. 15 is a view in cross section taken on the line 15—15 of Fig. 8.

A piece of work for which a machine of this invention is provided is well exemplified by the fore part of a moccasin details of which are shown in Figs. 9, 10 and 11. In such a construction the sheets of material are usually leather, one sheet 15 forming the side of the fore part and the other sheet 16 forming the top of the fore part as in the well known moccasin construction. These sheets are usually stitched together side by side by a line of stitching 17 and quite commonly the portions thus stitched together are skived on their abutting faces as indicated in Figs. 9 and 10, so that the protecting margins will be of less thickness than the combined thicknesses of the two sheets of leather. These projecting margins 18, however, have to be trimmed off so as to leave a neatly finished projecting portion beyond the line of stitching and it is the function of the machine of this invention to perform this work accurately, rapidly and efficiently.

The machine as illustrated comprises a suitable frame the main portion of which is preferably a casting comprising a base 20, an upright standard 21, and an overhanging arm 22. At the forward end of the base 20 is mounted a suitable support having a narrow edge to extend between and support the stitched-together sheets adjacent the line of stitching. In the preferred construction illustrated this support comprises a disk-like roll 23 having a narrow peripheral edge to extend between the sheets adjacent the line of stitching. This roll is journaled for free rotation on the pivot pin 24 in the upper end of a supporting standard adjustably mounted in a vertical hub 25 formed on the forward end of the base 20. In the construction illustrated this supporting standard comprises a sleeve 26, screw threaded in a suitable bearing 27 driven into the hub 25, carrying at its upper end a knurled head 28, and a shaft 29, in which the roll 23 is pivoted, fitting a bore in the sleeve 26. A collar 30 is adjustably secured to the shaft 29 by a set screw 31 and rests on the top of the knurled head 28. It will thus be seen that the shaft 29 is freely rotatable on its axis and that the roll may be vertically adjusted gradually and accurately by turning the knurled head 28, or more rapidly by adjusting the collar 30 thereon. A set screw 32 serves to lock the sleeve 26 in adjusted position.

The work is fed over the supporting roll parallel to the line of stitching by a pair of oppositely disposed feed rolls having their axes normal to the axis at 24 of the supporting roll 23 and positioned to engage the outer faces of the work. These rolls are supported in the overhanging arm 22 of the frame and are of similar construction, the one at the left being shown in detail in Fig. 3. Each roll is mounted on the bottom end of a vertical shaft and these shafts at the top are geared together and positively driven. Referring to the one shown at Fig. 3 the shaft 33 is mounted for rotation in a bearing 34 driven in the forward end of the overhanging arm 22 and has adjustably secured thereon, by means of a set screw 35, a collar 36 abutting at the lower end of the frame and by means of a set screw 37 the hub of a gear 38 abutting the top of the frame, thus enabling the shaft to be accurately positioned vertically. At its lower end the shaft 33 has secured thereto the feeding roll 39 the periphery 40 of which engaging the work is preferably beveled slightly. This feeding roll is provided with a hub fitting a reduced portion of the lower end of the shaft and is secured thereto by a screw 41 and a pin 42.

It will thus be seen that in the preferred construction illustrated the freely rotatable standard carrying the supporting roll 23 rotates on an axis which extends parallel to the axes of the feed rolls and that this axis of the standard extends through the axis of the supporting roll midway its side faces.

The gears 38 of the two feed roll shafts intermesh and one of the shafts, as for example the right-hand one, is driven causing the feed rolls to rotate simultaneously, engage the outer faces of the work and feed the work rearwardly over the supporting roll. In the construction illustrated the rolls are shown as driven by a suitable electric motor 43 mounted at the rear of the frame driving a vertical shaft 44 carrying a pulley 45 and a belt 46 extending from this pulley around a pulley 47 at the top of the shaft of the right hand feed roll.

The trimming operation is performed by the forcing of the work by the feeding operation against the cutting edge of a knife which cutting edge extends transversely the line of feed. Preferably it is desirable in the trimming of the projecting margins of the work to leave the finished trimmed edge with a smooth convex surface and this result is secured in the construction illustrated by a knife having the construction illustrated in Figs. 8, 13, 14 and 15. This knife is shown as a channel-shaped steel member mounted in a bracket 48 depending from the overhanging arm 22 and is longitudinally adjustable therein by the set screws 49. A concave groove 50 is formed in the bottom of the knife member and the cutting edge is formed on a fin-like portion 51 extending rearwardly in a smooth concave forwardly facing curve. Consequently it will be seen that the cutting edge 52 is concave with respect both to the line and the direction of the feed so that as the work is forced against it by the feeding rolls the projecting margins will be cut with a shearing action and the trimmed edge, as shown at 53 in Figs. 10 and 11, will have a smooth convex surface. This cutting edge of the knife member is preferably located substantially in line with the vertical axis of the supporting standard and consequently just above the top of the periphery of the supporting roll 23.

In order to avoid any tendency of the work to lift from the supporting roll a suitable hold-down foot may be employed. Such a foot is shown at 54 having its shank 55 mounted in and vertically adjustable in the overhanging arm by means of a set screw 56.

The operation of the machine will be apparent. The operator places the work in position so that the support, such as the supporting roll, extends between the two sheets of material with its narrow peripheral edge supporting the work close to the line of stitching. The adjustments provided for the supporting standard enable the work to be positioned accurately under all conditions. In the preferable construction illustrated the mounting of the support on the rotatable supporting standard readily enables any character of work, such, for example, as the curved toe portion of the moccasin, accurately to be fed against the cutting edge of the knife and the projecting margins to be trimmed accurately, rapidly and efficiently, and finished in the preferred form with a smooth convex surface.

Having thus described the invention, what is claimed as new and desired to be secured by Letters Patent is:

1. A machine for trimming the projecting margins of two side-by-side stitched together sheets of flexible material of a piece of work comprising a support having a narrow edge to extend between and support the sheets adjacent the line of stitching, a pair of oppositely disposed feed rolls positioned to engage the outer faces of the work and feed the work over the support parallel to the line of stitching, a knife mounted with its cutting edge extending transversely the line of feed, and means for rotating the feed rolls to force the margins against, and cause the edge portions thereof to be trimmed off by, the knife at a predetermined distance from the line of stitching.

2. A machine having the construction and operation defined in claim 1 togteher with means for bodily adjusting the support toward and from the feed rolls to determine the distance between the line of trimming and the line of stitching.

3. A machine having the construction and operation defined in claim 1 in which the cutting edge of the knife is concave to cause the trimmed edge of the margins to have a convex surface.

4. A machine having the construction and operation defined in claim 1 in which the cutting edge of the knife is concave with respect both to the line and the direction of feed to cause the knife to cut with a shearing action and the trimmed edge of the margins to have a convex surface.

5. A machine having the construction and operation defined in claim 1 together with a hold-down foot mounted to extend over the margins ahead of the feed rolls and prevent the work from lifting from the support during trimming.

6. A machine for trimming the projecting margins of two side-by-side stitched together sheets of flexible material of a piece of work comprising a rotatable supporting roll having a narrow peripheral edge to extend between and support the sheets adjacent the line of stitching, a pair of oppositely disposed feed rolls having their axes normal to the axis of the supporting roll and positioned to engage the outer faces of the work and feed the work over the supporting roll parallel to the line of stitching, a knife mounted with its cutting edge extending transversely the line of feed, and means for rotating the feed rolls to force the margins against, and cause the edge portion thereof to be trimmed off by the knife at a predetermined distance from the line of stitching.

7. A machine having the construction and operation defined in claim 6 together with a supporting standard and in which the supporting roll is journaled on the standard and in which the standard is mounted for free rotation on an axis extending parallel to the axes of the feed rolls and through the axis of the supporting roll midway its side faces.

8. A machine having the construction and operation defined in claim 6 together with a supporting standard and in which the supporting roll is journaled on the standard and in which the standard is mounted for free rotation on an axis extending parallel to the axis of the feed rolls and through the axis of the supporting roll midway its side faces, together with means for bodily adjusting the standard longitudinally the axis to adjust the supporting roll toward and from the feed rolls to determine the distance between the line of trimming and the line of stitching.

FORREST F. MURRAY.

No references cited.